March 16, 1937.  P. S. WARD  2,073,892
BAKING PAN
Filed Aug. 22, 1934   3 Sheets-Sheet 2

INVENTOR
Paul S. Ward
by Byrnes, Stebbins & Blenko
his attorneys

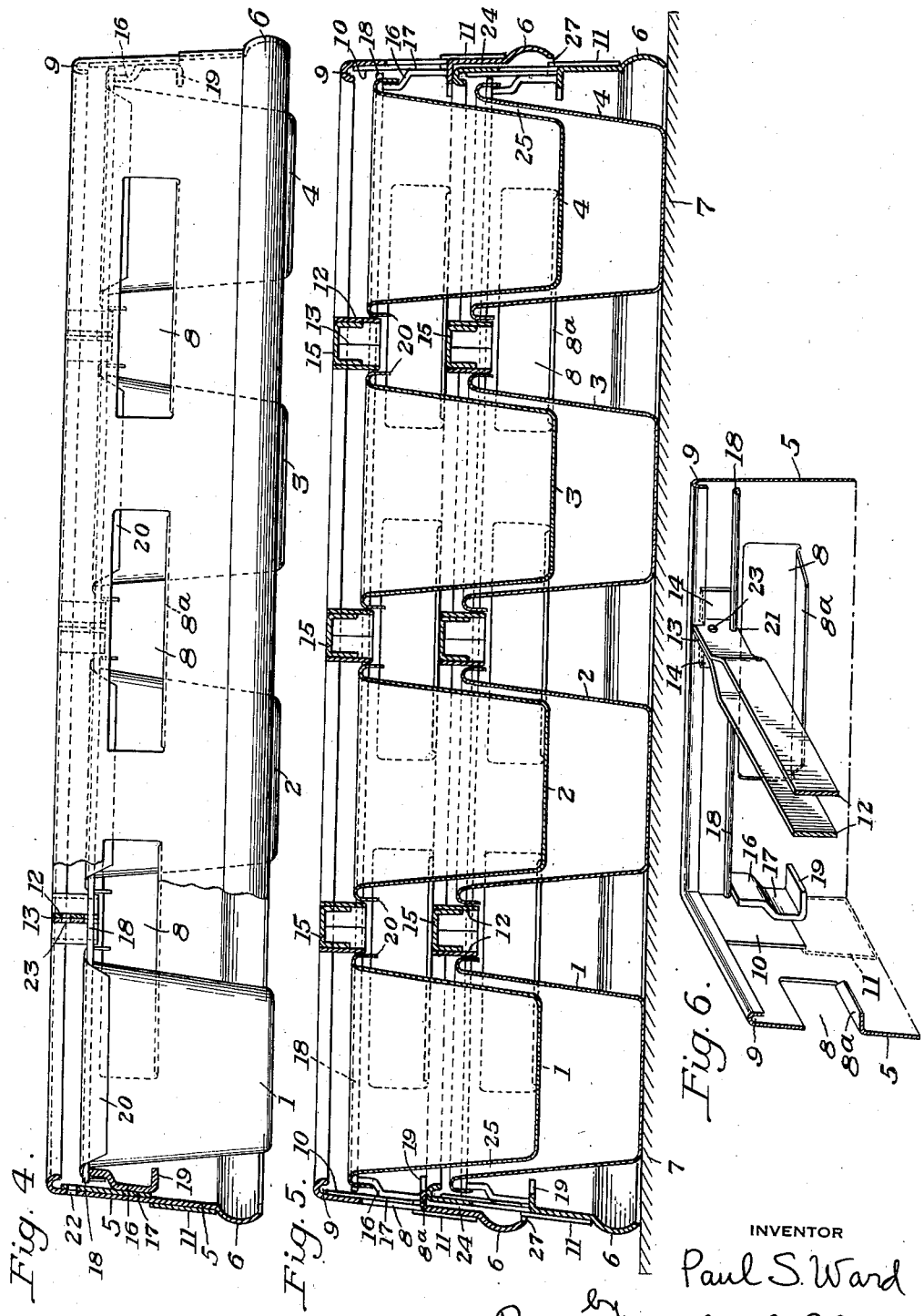

Patented Mar. 16, 1937

2,073,892

UNITED STATES PATENT OFFICE 2,073,892

BAKING PAN

Paul S. Ward, Cincinnati, Ohio, assignor of part interests to George E. Stebbins, Edgewood, Pa., and Ashley F. Ward, Rebecca A. Ward, Blanche F. Ward, Helen E. Ward, Ashley F. Ward, Jr., and John A. Ward, all of Cincinnati, Ohio Application August 22, 1934, Serial No. 740,879

14 Claims. (Cl. 53—6)

The present invention relates to baking pans, and more especially to a set or multiple of baking pans, such, for example, as are used by commercial bakers for baking bread.

In my set of baking pans, a plurality of baking pans are surrounded and supported by a frame which holds them in properly spaced relation. The frame is preferably of sheet metal and of a height approximately that of the pans, so as to protect the sides of the pans. The pans are preferably mounted in the frame so as to have a limited vertical and rocking movement whereby the pans may individually adjust themselves to inequalities of the oven hearth. Other features and advantages of the invention will be apparent from the following description of its preferred embodiment.

In the drawings,—

Figure 4 is a side elevation of the set of pans partly broken away;

Figure 5 is a vertical section along the line V—V of Figure 1; and

Figure 6 is a perspective view of the inside of one of the corners of the frame.

Figure 1:
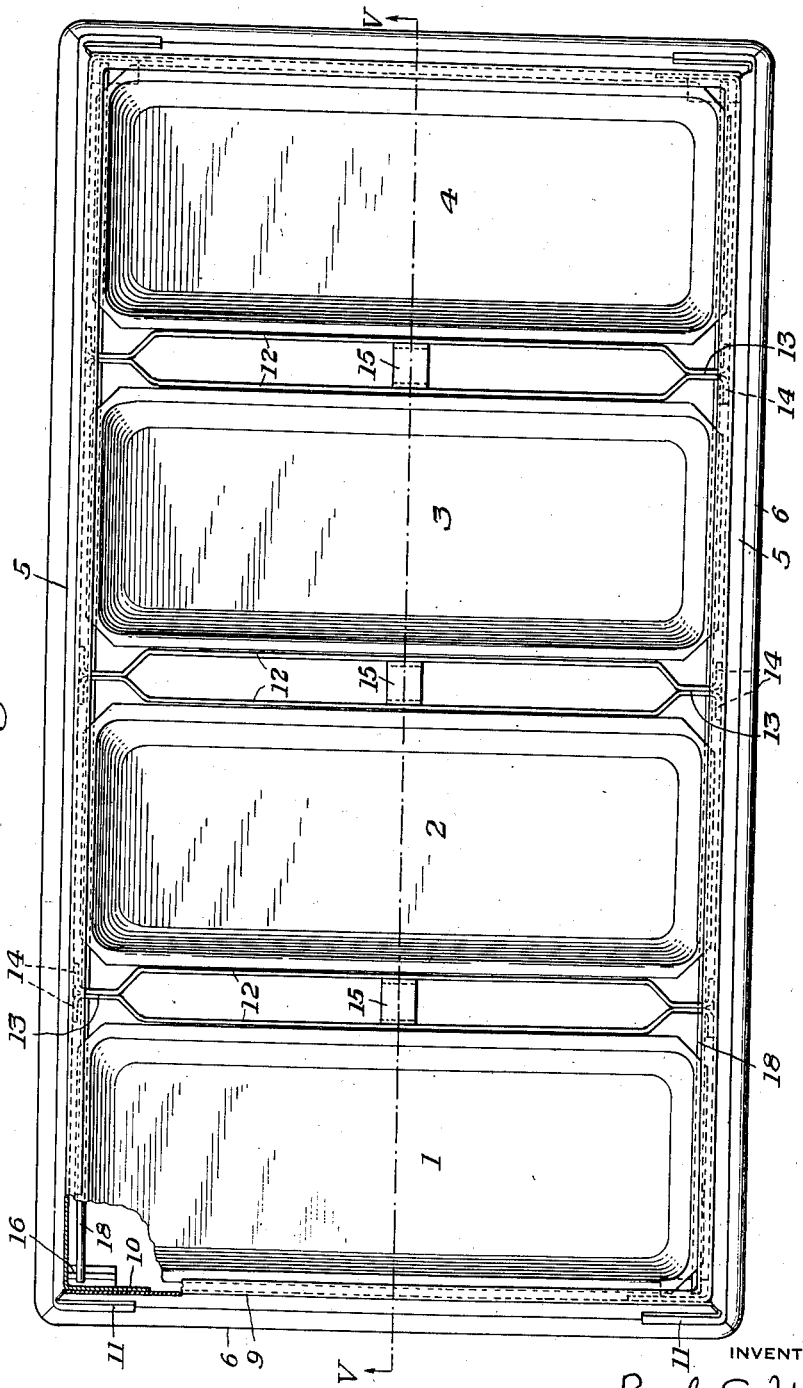
Figure 1 is a plan view of a set of baking pans embodying my invention.

In the illustrated embodiment of the invention, the set of pans comprises four bread baking pans 1, 2, 3 and 4, which are carried within a supporting frame indicated generally by reference numeral 5.

The frame 5 is preferably made of fairly heavy gauge sheet steel. The frame 5 has a height substantially equal to that of the pans, and preferably, as shown in the drawings, a slightly greater height than the pans, in order to thoroughly protect the sides of the pans against injury or denting, such as from careless handling or by contact with the baker's peel. The frame 5 is flared downwardly and outwardly so as to form a skirt around the set of pans. This outward flaring of the frame or skirt insures proper spacing of the set of pans from adjacent sets in the oven. The bottom edge of the frame is turned outwardly and then inwardly to form a bead 6, which facilitates the entry of the baker's peel beneath the set. This beading also stiffens the bottom of the frame. The edge of the frame rests upon the oven hearth or other support 7 as shown in Figure 5. Windows 8 are cut through the upper part of the sheet metal frame to provide ventilation and also to give hand holds for handling the set of pans. Short lengths of metal at the bottom of the windows are preferably turned inwardly to form ledges 8a which serve as stops to engage the top of a set of pans next beneath when a number of sets of pans are stacked. These ledges also provide a somewhat wider hand hold when the pans are handled in inverted position by the baker to discharge the bread and shake out the crumbs and in stacking the sets of pans in inverted position.

The upper edge of the sheet metal frame is flanged inwardly to form an inverted J, indicated by reference numeral 9, which forms a smooth upper edge on the frame and which overlies and retains the upper edges of the baking pans. The frame 5 is preferably formed from four pieces of sheet metal forming the four sides of the frame. The ends of the pieces forming the side members of the frame are slit and bent inwardly to form ears 10 and 11 which are welded to the inside and outside of the end pieces of the frame, as illustrated in Figure 6.

Cross braces or spacers 12 extend across the upper part of the frame between the baking pans. These spacers are formed of two strips of sheet metal spaced apart along their middle portions and brought together and welded at 13. The ends of the strips are bent outwardly at 14 and are welded to the inside of the frame. Struts 15 are preferably interposed between the spaced-apart middle portions of the cross braces 12 to stiffen them. The cross braces contribute considerable stiffness to the frame. While the pans themselves are removable and loosely mounted in the frame, nevertheless they also contribute to the stiffness of the assembly because the frame cannot be bodily sprung or deformed to any extent without being backed up by the pans.

At the inside of each of the four corners of the frame are bent pieces of sheet metal 16 welded to the frame at 17 and which serve the combined function of stops for holding a set of pans in spaced relation to the next set of pans in stacking, and of supporting the wire rods 18 which secure the pans in place.

As shown in Figure 5, the inwardly bent bottom portions 19 of the metal pieces 16 serve as stops which engage the top edge of the frame of a set of pans next beneath when a plurality of sets of pans are stacked together. The inwardly bent ledges 8a, which are at the same level as the stops 19, share with the stops 19 the function of supporting the set of pans and controlling the depth of nesting when a number of sets of pans are stacked.

The baking pans themselves are formed of thin sheet metal, such as tin plate or aluminum. They are preferably made of sheet aluminum drawn into pan form. The edges of the baking pans on all four sides thereof are bent outwardly and downwardly into the form of an inverted J indicated by reference numeral 20. This bent-over flange stiffens the upper edges of the pans and dispenses with usual stiffening wiring, and at the ends of the pans it forms a downwardly open channel which gives a locking engagement with the wire rods 18 which lock the pans in place within the frame.

The wire rods 18 are preferably formed of rather heavy spring steel wire. The ends of the rods are supported, as above mentioned, by the tops of the metal pieces 16. The intermediate portions of the wire rods are supported by the ends of the cross braces 12, rod engaging holes 21 being formed through the lower edges of the portions 13 of the cross braces, as shown in Figure 6. A hole 22 is formed through the end wall of the frame for the insertion and removal of a rod 18. The hole 22 is spaced somewhat above the normal position of the wire rod 18 so that it is held in place by contact with the inside of the end wall of the frame when in normal position. When it is desired to remove the wire rod for replacing the pans, the end of the rod is bent up into engagement with the hole 22, and the rod is then readily withdrawn through the hole 22. This renders the pans readily replaceable in the frame.

Figure 2:
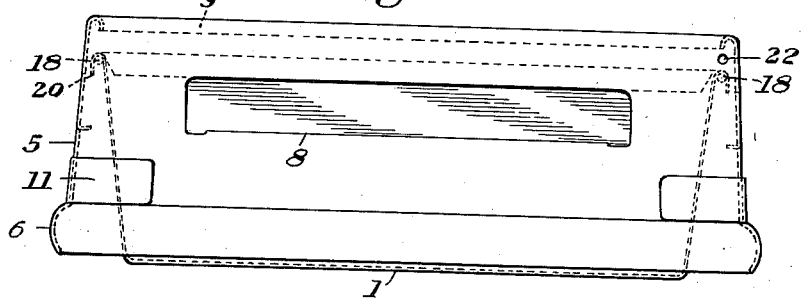
Figure 2 is an elevation of one end of the set of pans.

As shown in the dotted lines in Figure 2, the bent over edges at the ends of the baking pans engage over the top and sides of the rods 18, thus supporting and locking the baking pans in position. Each baking pan has a limited vertical and rocking movement permitted with relation to the frame by reason of the loose connection thus afforded between the rods 18 and the bent over top flanges of the baking pans. As shown in Figure 2, when a set of pans is held in the hands of the baker in upright position, the bent over flanges at the tops of the pans engage the tops of the rods 18 to support the pans with their bottoms depending slightly below the plane of the lower edges of the frame 5. When the pans are placed on the oven hearth or other support in an upright position, the pans rest upon the hearth under their own weight, being lifted by the support of the hearth off of the rods 18. This permits each pan of the set to adjust itself into good contact with the hearth despite irregularities in the hearth. The pans not only have a slight vertical movement whereby they can each settle against the hearth, but also have a limited rocking movement due to the loose connection between the bent over flanges 20 and rods 18, whereby the bottoms of the pans can adjust themselves to any local irregularities of inclination in the oven hearth.

This feature of loose mounting whereby the pans can individually adjust themselves into good contact with the oven hearth is important in insuring even baking at the bottoms of all of the pans of the set. This avoids the uneven baking, or what is known in the baking trade as "pale bottoms", which may result from using a set of pans which are rigidly strapped together so that the bottom of the pan or a part of the bottom of the pan may be held out of contact with the oven hearth if the oven hearth be irregular. The loose individual mounting of the baking pans of my set of pans insures that the bottom of each pan may seek its own level under gravity and may adjust itself snugly against the oven hearth.

The individual pans have a limited freedom of movement above that shown in Figure 5, as they may be pushed upwardly until the edges of the pans are brought into engagement with the inwardly turned flange 9 of the top of the frame 5. This ability of the pans to yield freely and individually is of importance in protecting the bottoms of the pans against denting in handling. If the set of pans be put down upon an irregular surface, or if, for any reason, the bottom of the pan receives a blow, the pan is free to move upwardly within the frame, and thus avoid or minimize denting of the bottom of the pan.

When the set of pans is inverted, as shown, for example, in Figure 3, the pans are supported by their top edges 20 engaging the over-turned edge 19 of the frame, and the bottoms of the pans recede below the plane of the then upper edge of the inverted frame, thus protecting the bottoms of the pans against injury.

It will be seen from the foregoing description and the drawings that the baking pans are well protected against injury by the wide frame which has a height substantially equal to and preferably somewhat greater than the height of the pan, and by the ability of each pan to have a limited free movement within the frame. The bottoms and sides of the pans are thus well protected. The tops of the pans are protected by means of the overlying inturned edge 9 of the frame and by the cross braces 12 which extend above the top cages of the pans. This full protection for the entire pan makes possible the satisfactory use of aluminum for the baking pans. Aluminum has many advantages as a baking pan material, such as greater heat conductivity than tin plate. It requires much less greasing than does a tin plate pan. Aluminum, however, is a relatively soft material which dents readily and this has generally precluded its use in sets of making pans of the rigidly strapped type heretofore commonly in use in commercial bakeries. The protection against denting afforded in my set of baking pans permits the use of the better but softer aluminum as the pan material. The parts of the frame, however, are preferably made of strong cold rolled steel strip, as they serve as the shield against mechanical injury to the set. While I prefer the combination of the steel frame supporting and protecting softer aluminum baking pans, the baking pans may be made of the usual tin plate material.

While I prefer to have the baking pans loosely mounted so that their bottoms may individually adjust themselves either above or below the plane of the bottom of the frame, especially for use in ordinary ovens where reliance is placed on conduction of heat from the oven hearth properly to bake the bottom and sides of the bread loaf, the baking pans may be supported within the frame so as to be spaced somewhat above the oven hearth, particularly for ovens having hotter bottoms. If this is desired, holes 23 (Figure 6) are formed through the ends of the cross braces so as to support the rods 18 in a higher position. When the rods are put through the holes 23 the pans are elevated so that their bottoms are slightly above the plane of the bottom edge of the frame and slightly spaced from the oven hearth. In this modification the pans are held relatively rigidly since the higher position of the rod 18 holds the bent-over top edges 20 of the pans against the inturned flange 9 of the frame.

In either case, the pans are readily replaceable without the use of any special tools since the withdrawal of the rods 18 frees all of the pans of the set. In general, the pans will become worn out much quicker than the frame. This allows the baker to easily replace a worn out pan or pans of a set.

The walls of the frame are less inclined to the vertical than the walls of the baking pans. The result is that when two or more sets of pans are nested, as shown, for example, in Figure 5, there is less lateral spacing between the frames than between the pans themselves. For example, the space marked 24 between the frames is less than the space marked 25 between the sides of the pans. There is therefore only a small amount of lateral movement permitted between two sets of pans, and this movement is insufficient to bring the soiled bottom of one pan into engagement with the inside of the pan in which it is nested. Soiling of the pans during nesting is thus absolutely prevented. The bottom edges of the beads 6 are preferably spaced slightly away from the outside face of the frame of the next set, as shown at 27 in Figure 5, thus allowing some air to enter between frames when stacked.

The outward inclination or flare of the frames whereby one frame fits over the other when the sets of pans are stacked, allows compact nesting in the stack of pans even with frames having a height equal to that of the pans.

The only metallic contact between the supporting frame and the pans is that of the rods 18 and the engagement of the outturned edges 20 of the pans with the sides of the frames and the spacer bars. The pans are well spaced apart from themselves and from the frame, so there is no metallic contact of strapping bars or close proximity of heavy metal parts which would tend to prevent free absorption of heat over the entire baking area of the pan. There is therefore greater uniformity of baking than in the usual type of pans in which strapping bars are directly connected with the sides of the pans.

There is free access for the oven gases around each pan. The windows 8 allow circulation through the frame, and there is adequate circulation through the spacer bars 12 and around the edges of the pans. This free circulation is not only of advantage in baking, but also in cooling the pans.

After the bread is baked, the baker inverts the pans to discharge the loaves and shake out any crumbs from the pans. The baker can then, without turning the set of pans right side up, place the pan on a bench as indicated at 26 in Figure 3. He can then stack more pans, one above the other, in an inverted position.

Figure 3:
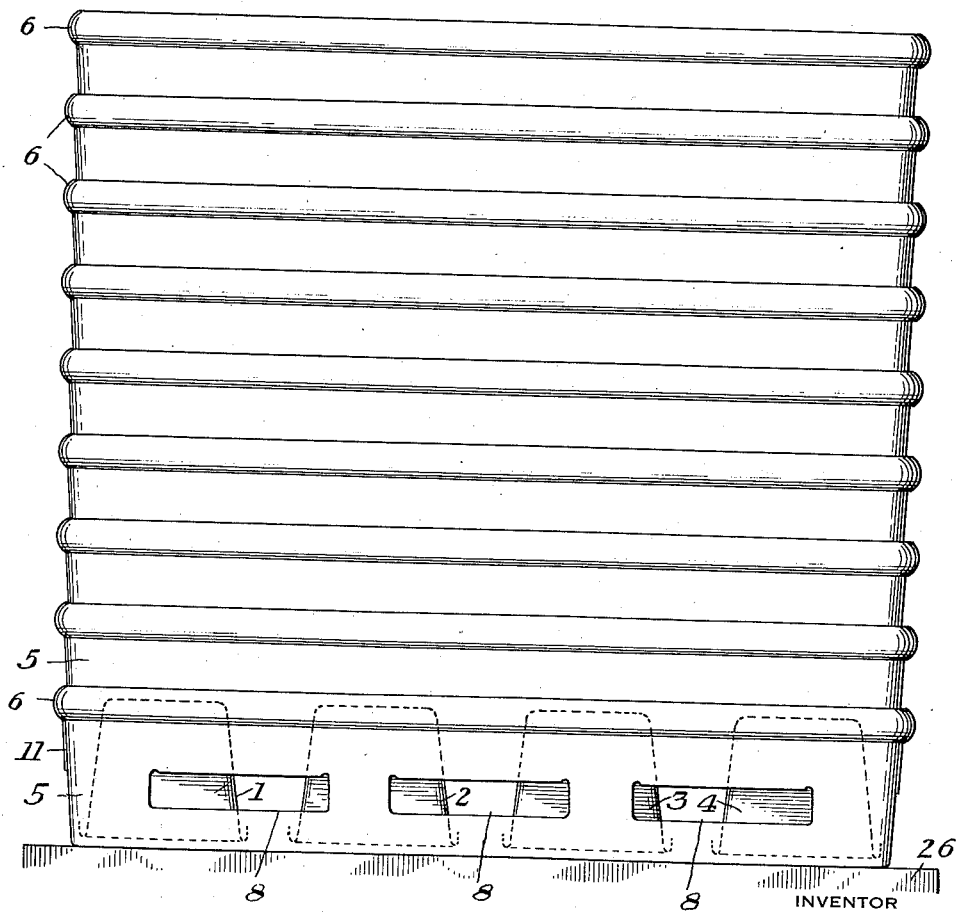
Figure 3 is a side elevation showing a number of pans stacked in an inverted position.

It will be noted, as shown in Figure 3, that the windows 8 of the lowermost set are entirely unobstructed by the frame of the second set which is nested within the inverted frame of the bottom set. This is because of the positioning of the windows 8 near that edge of the frame which is uppermost when the set is in upright position. Therefore, when a number of pans are stacked in inverted position, as shown in Figure 3, the windows of the bottommost set are exposed and allow free ingress of air which passes up through the set of pans around the edges of the pans and through the divided spacer bars 12 and out through the open top of the stack, which serves as a flue to induce a cooling circulation of air through itself. This permits quicker cooling of a stack of pans and consequent possibility of quicker re-use in the oven.

While I have specifically illustrated and described the preferred embodiment of my invention, it is to be understood that the invention is not so limited but may be otherwise embodied within the scope of the following claims.

I claim:

1. A set of baking pans comprising a downwardly and outwardly flared sheet metal frame adapted to rest upon the oven hearth, a plurality of banking pans within the frame, and loose connections between the top portions of the pans and the top portion of the frame permitting a limited movement of the bottoms of the pans below and above the level of the bottom of the frame.

2. A set of baking pans comprising a downwardly and outwardly flared sheet metal frame of a height at least substantially that of the pans and adapted at its lower edge to rest upon the oven hearth, a plurality of pans within the frame having their upper edges bent outwardly and downwardly on at least two sides of the pans so as to leave downwardly open channels, and loose connections between the frame and pans comprising supporting rods received in the downwardly open channels at the pan edges permitting a limited vertical and rocking movement between each pan and the frame, whereby the individual pans are free to adjust themselves to the oven hearth.

3. A set of baking pans comprising a plurality of outwardly and upwardly flared baking pans, a sheet metal frame enclosing the pans, of a height at least substantially that of the pans, adapted to nest over the frame of another set of pans when stacked and flared outwardly and downwardly at a less inclination to the vertical than the flare of the pans whereby when a number of such sets are stacked contact between the insides and bottoms of the nested pans is prevented, means engaging the upper portions of the pans for supporting them within the frame, and stops on the frame to hold it in spaced nested relation with an adjacent set of pans when they are stacked.

4. A plurality of sets of baking pans, each set having a sheet metal frame of a height at least substantially equal to that of the pans, said frame having ventilating windows formed through the upper part of the frame and having its lower portion disposed for nesting over the next frame beneath, and upwardly and outwardly flared pans supported within the frame, the windows in the frame of the lowermost set being exposed when a plurality of sets are stacked in inverted position.

5. A plurality of sets of baking pans, each set having a downwardly and outwardly flared sheet metal frame of a height substantially that of the pans and having ventilating windows formed through the upper part of the frame, upwardly and outwardly flared pans supported within the frame, the angle of inclination to the vertical of the frame being less than that of the sides of the pans, the pans having flanges at their upper edges, and means for loosely supporting the pans within the frame so as to permit each pan to have a limited vertical and rocking movement within the frame comprising rods for engaging the flanged edges of the pans, means on the frames for holding the sets of pans in spaced nested relation when stacked, the windows in the frame of the lowermost set being exposed when a plurality of sets are stacked in inverted position.

6. A set of baking pans comprising a plurality of pans having their upper edges at their ends bent outwardly and downwardly to form rod-receiving channels, a frame of a height at least substantially equal to that of the pans surrounding and protecting the sides of the pans, cross braces extending across the frame between adjacent pans to space them apart, and means for securing the pans in the frame comprising rods secured to the cross braces and engaged in the channels of the pan ends.

7. A set of baking pans comprising a plurality of baking pans having outwardly flanged upper edges, a frame surrounding the pans and of a height at least substantially equal to that of the pans, the upper edge of the frame being bent inwardly to overlie the top flanged edges of the pans, and means spaced below the inturned upper edge of the frame and engaging beneath the flanged edges of the pans to permit a limited vertical and rocking movement of each pan within the frame so as to allow the pans individually to adjust themselves to an oven hearth.

8. A set of baking pans comprising a plurality of baking pans having outwardly flanged upper edges, a sheet metal frame surrounding the pans and adapted to rest at its lower edge upon an oven hearth, the upper edge of the frame being bent inwardly to overlie the top flanged edges of the pans, and means removably secured to the frame and engaging beneath the flanged upper edges of the pans for removably holding the pans in the frame.

9. A set of baking pans comprising a plurality of baking pans, a supporting frame of a height greater than that of the pans surrounding the pans and having its bottom edge adapted to rest upon the oven hearth along the sides and ends of the set, thereby to protect the bottoms of the pans, and having its upper edge extending above and protecting the tops of the pans, and loose connections between the frame and the top portions of the pans permitting a limited movement of the bottoms of the pans below and above the level of the bottom of the frame.

10. A set of baking pans comprising a plurality of baking pans, a sheet metal frame surrounding and protecting the pans and having a height at least substantially that of the pans, said frame having its lower portion outwardly disposed so as to nest over the frame of a similar set of pans.

11. A plurality of sets of baking pans, each set comprising a plurality of baking pans, a frame surrounding and supporting the pans and of a height at least substantially that of the pans, means for loosely mounting the pans of each set within its frame, the frames having means for engaging the frames of adjacent sets when the sets are stacked for holding the stacked sets in vertical alinement and preventing contact with the pans themselves.

12. A set of baking pans comprising a plurality of baking pans, a frame surrounding and protecting the sides of the pans, and loose connections between the pans and the frame for holding the pans in the frame with their bottoms at approximately the level of the lower edge of the frame but permitting a limited movement between each pan and the frame to allow each pan independently to adjust itself to an oven hearth.

13. A set of baking pans comprising a frame holding the pans assembled as a set, a plurality of baking pans held in the frame and adapted to have their bottoms engage and be supported upon an oven hearth, and loose connections between the pans and the frame permitting a limited movement between each pan and the frame to allow each pan independently to adjust itself to the oven hearth.

14. A set of baking pans comprising a plurality of baking pans and means for holding the pans assembled as a set with the pans held in substantially the same horizontal plane having provision for permitting a limited vertical relative movement between the individual pans to allow each pan independently to adjust itself to an oven hearth.

PAUL S. WARD.